(12) United States Patent
Delapierre et al.

(10) Patent No.: US 9,243,562 B1
(45) Date of Patent: Jan. 26, 2016

(54) ROTATING INLET COWL FOR A TURBINE ENGINE, COMPRISING AN ECCENTRIC FORWARD END

(71) Applicant: SNECMA, Paris (FR)

(72) Inventors: Mickael Delapierre, Paris (FR); Herve Gignoux, Vaux le Penil (FR); Gael Loro, Combs la Ville (FR); Sylvie Wintenberger, Paris (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/620,798

(22) Filed: Feb. 12, 2015

Related U.S. Application Data

(63) Continuation of application No. 13/262,386, filed as application No. PCT/EP2010/054080 on Mar. 29, 2010, now Pat. No. 8,984,855.

(30) Foreign Application Priority Data

Mar. 31, 2009 (FR) ...................... 09 52056

(51) Int. Cl.
*F02C 7/047* (2006.01)
*F02C 6/20* (2006.01)
*F02K 3/06* (2006.01)

(52) U.S. Cl.
CPC ................. *F02C 7/047* (2013.01); *F02C 6/206* (2013.01); *F02K 3/06* (2013.01); *Y02T 50/671* (2013.01); *Y02T 50/672* (2013.01)

(58) Field of Classification Search
CPC ................ Y10T 137/0536; Y10T 137/0645; B64D 33/02; B64D 15/166; B64D 15/12; B64D 15/16; B64D 2033/0233; F02C 7/047; F02C 7/04; F02C 7/042; F02C 7/052; F02C 7/055; Y02T 50/671; Y02T 50/672; F01D 25/02; B64F 5/0054; B64F 5/0063; F05D 2260/607; B01D 2279/60
See application file for complete search history.

(56) References Cited

U.S. PATENT DOCUMENTS

| | | |
|---|---|---|
| 1,867,809 A | 7/1932 | Chase |
| 2,401,247 A | 5/1946 | Hunter |
| 2,612,227 A | 9/1952 | Cushman |
| 3,234,866 A | 2/1966 | Johnston et al. |
| 3,574,480 A | 4/1971 | Hoepfner |
| 3,750,397 A | 8/1973 | Cohen et al. |
| 3,990,814 A | 11/1976 | Leone |
| 4,129,984 A | 12/1978 | Nelson |
| 4,393,650 A | 7/1983 | Pool |

(Continued)

FOREIGN PATENT DOCUMENTS

| | | |
|---|---|---|
| GB | 540 711 | 10/1941 |
| GB | 1 557 856 | 12/1979 |

OTHER PUBLICATIONS

International Search Report issued Jun. 8, 2010 in PCT/EP10/054080 filed Mar. 29, 2010.

*Primary Examiner* — Ehud Gartenberg
*Assistant Examiner* — Karthik Subramanian
(74) *Attorney, Agent, or Firm* — Oblon, McClelland, Maier & Neustadt, L.L.P

(57) ABSTRACT

A rotating inlet cowl for a turbine engine includes a rotation axis. The rotating inlet cowl includes a forward cone defining a forward end of the inlet cowl. The forward end is configured to be eccentric relative to the rotation axis of the inlet cowl. Furthermore, the forward cone is truncated by a truncation surface defining the forward end of the inlet cowl.

10 Claims, 2 Drawing Sheets

(56) References Cited

U.S. PATENT DOCUMENTS

| | | | |
|---|---|---|---|
| 4,699,568 A | 10/1987 | Harlamert et al. | |
| 4,863,354 A | 9/1989 | Asselin et al. | |
| 5,088,277 A | 2/1992 | Schulze | |
| 5,149,251 A | 9/1992 | Scanlon et al. | |
| 5,214,914 A * | 6/1993 | Billig | F02C 7/042 137/15.1 |
| 6,354,538 B1 * | 3/2002 | Chilukuri | B64D 15/04 244/134 B |
| 6,439,148 B1 * | 8/2002 | Lang | B63B 1/107 114/272 |
| 6,439,840 B1 * | 8/2002 | Tse | F02C 7/045 415/1 |
| 6,447,250 B1 * | 9/2002 | Corrigan | F01D 5/3007 416/193 A |
| 6,447,255 B1 * | 9/2002 | Bagnall | F01D 5/066 277/626 |
| 6,520,742 B1 * | 2/2003 | Forrester | F01D 5/06 416/220 R |
| 6,887,043 B2 * | 5/2005 | Dix | F01D 5/066 416/244 A |
| 7,650,678 B2 * | 1/2010 | Bogue | B23P 6/002 29/402.01 |
| 2002/0027180 A1 * | 3/2002 | Porte | B64D 15/04 244/134 R |
| 2005/0274103 A1 * | 12/2005 | Prasad | B64D 33/02 60/226.1 |
| 2005/0279878 A1 * | 12/2005 | Rado | B64C 3/42 244/2 |
| 2007/0264128 A1 * | 11/2007 | Grudnoski | F01D 25/162 416/244 R |
| 2008/0190093 A1 * | 8/2008 | Gauthier | F01D 25/02 60/39.093 |
| 2009/0260341 A1 * | 10/2009 | Hogate | F02C 7/047 60/39.093 |
| 2010/0226786 A1 * | 9/2010 | Mahan | F02C 7/04 416/245 R |
| 2010/0264654 A1 * | 10/2010 | Prasad | F03D 1/06 290/50 |
| 2011/0236217 A1 * | 9/2011 | Bottome | F04D 29/321 416/245 R |
| 2011/0238380 A1 * | 9/2011 | Hurlburt | B64D 33/02 702/187 |

* cited by examiner

ROTATING INLET COWL FOR A TURBINE ENGINE, COMPRISING AN ECCENTRIC FORWARD END

CROSS-REFERENCE TO RELATED APPLICATIONS

This application is a continuation of U.S. application Ser. No. 13/262,386, filed Sep. 30, 2011. U.S. application Ser. No. 13/262,386 is a U.S. National Stage Application under 35 U.S.C. §371 of International Application No. PCT/EP2010/054080 filed Mar. 29, 2010, which claims priority to French Application No. 09 52056 filed Mar. 31, 2009. The entire contents of each of the above applications are incorporated herein by reference.

TECHNICAL FIELD

This invention relates to the field of turbine engines, and more particularly to aircraft turbine engines, preferably of the turbojet type. More specifically, the invention relates to the rotating inlet cowl fitted on these turbine engines.

STATE OF THE PRIOR ART

Such a rotating inlet cowl is usually composed of two parts fixed to each other, the forward part in the form of a cone and the aft part in the form of a shroud. The aft end of the aft shroud is flush with the fan blade platforms in a known manner, and is in aerodynamic continuity with them and in front of them.

The front cone has a forward end shaped like a cone tip centred on the axis of rotation of the inlet cowl, also corresponding to the longitudinal axis of the fan and the entire turbine engine.

This tip is known as being a point on the turbine engine at which ice can easily collect, because the fact that it is centred on the axis of rotation makes it impossible to apply large centrifugal forces. Consequently, ice forming on the cone tip can become large before it breaks off, introducing the risk of causing damage to the fan blades that it strikes when it finally breaks free from the tip.

It is known that a de-icing system can be installed to reduce this risk, the purpose of which is to assure that ice collected on the cone tip is ejected before it reaches a critical size. However, this type of system is expensive in terms of mass and dimensions, and especially it is particularly difficult to install due to the rotation of the inlet cowl on which it is fitted.

SUMMARY OF THE INVENTION

The purpose of the invention is therefore to provide at least partially a solution to the disadvantages mentioned above, compared with the embodiments of the prior art.

To achieve this, the first purpose of the invention is a rotating inlet cowl for a turbine engine, said cowl having a rotation axis and comprising a forward cone defining a forward end of the cowl. According to the invention, this forward end is arranged to be eccentric relative to this rotation axis of the inlet cowl, and said forward cone is truncated by a truncation surface defining said forward end of the inlet cowl.

Thus, during operation, when ice has collected on the forward end of the inlet cowl, the eccentric nature of the end advantageously means that ice will be subject to high centrifugal forces. These will facilitate its ejection so that it will separate from the rod before it reaches a critical size that could damage the downstream fan blades.

Consequently, the invention has the advantage that it is based on a simple design, is extremely reliable and is not very penalising in terms of cost and size. The fact that it results from a forward cone being truncated makes a large contribution to the simplicity of its design.

According to one preferred embodiment of this invention, said forward cone is oblique with an axis inclined from said axis of rotation of the inlet cowl. Nevertheless, it is also possible that the forward cone could be straight, that its axis could be coincident with said inlet cowl rotation axis. The advantage is then that it is possible to start from a conventional forward cone according to prior art and to truncate it in order to achieve the required embodiment.

Preferably, said truncation surface is approximately plane, inclined relative to a plane orthogonal to the axis of rotation of the inlet cowl.

As mentioned above, regardless of what embodiment is envisaged, the rotating inlet cowl preferably comprises said front cone and a rear shroud.

Finally, another purpose of the invention is a turbine engine, preferably for an aircraft, comprising a rotating inlet cowl like that described above.

Other advantages and characteristics of the invention will appear in the non-restrictive detailed disclosure below.

BRIEF DESCRIPTION OF THE DRAWINGS

This description will be made with reference to the attached illustrations, among which.

DETAILED DESCRIPTION OF PREFERRED EMBODIMENTS

Figure 1:
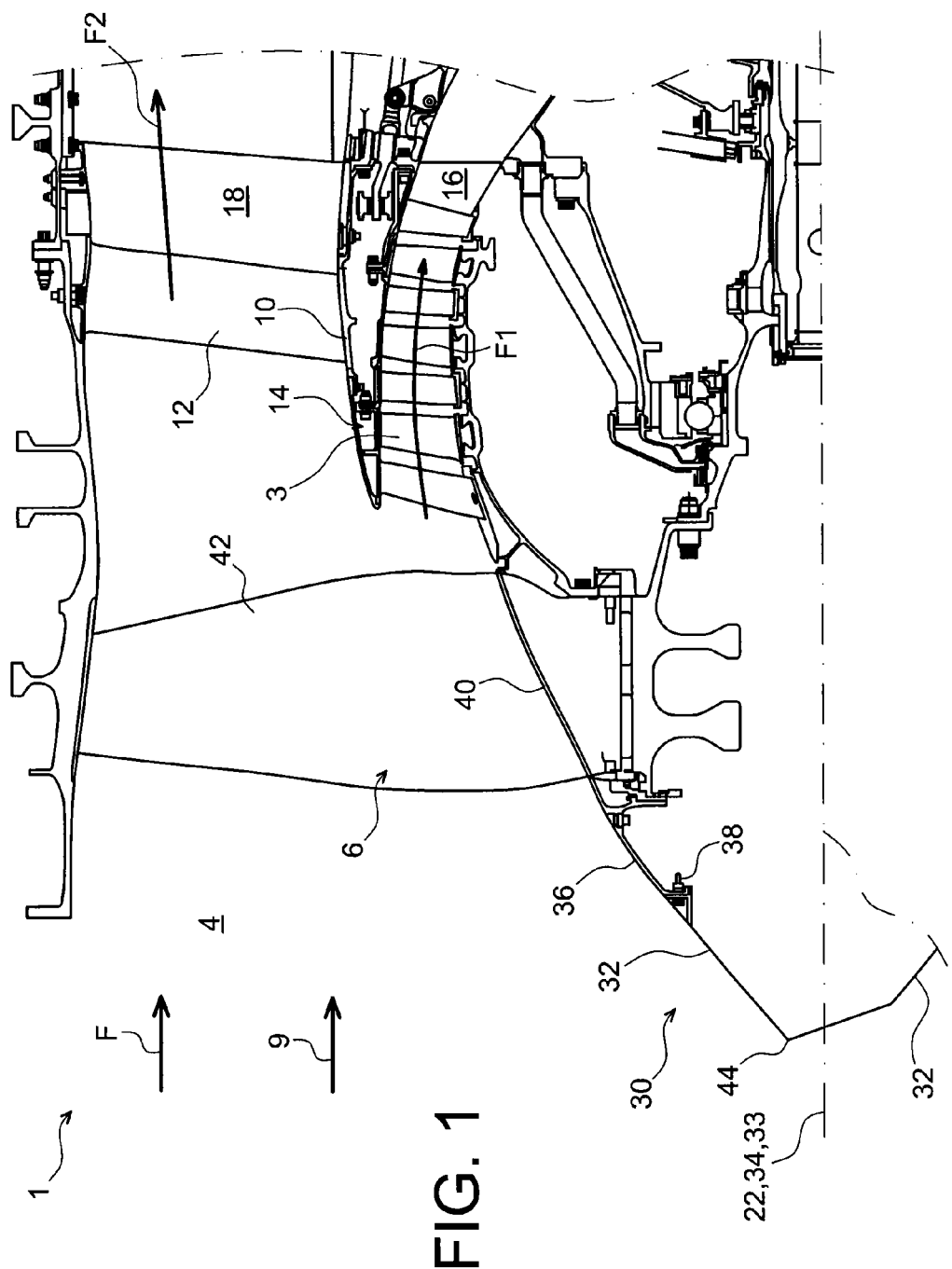
FIG. 1 shows a longitudinal half-sectional view of a forward part of an aircraft turbine engine according to a preferred embodiment of this invention.

FIG. 1 shows a forward part 1 of a turbine engine for a turbojet type aircraft, according to a preferred embodiment of this invention.

In FIG. 1, only the low-pressure compressor 3 of the gas generator has been represented, which is, for example, a two-compressor generator.

Starting from the forward end and following the general direction of fluid flow through the turbine engine towards the aft end as shown diagrammatically by the arrow 9, the turbine engine is provided with an air intake 4, a fan 6, a splitter 14 from which an annular core engine flow 16 and an annular fan flow 18 arranged radially outside the core engine flow 16, and an inner ring 10 supporting the fan outlet guide vane assemblies 12. Obviously, each of these conventional elements known to those skilled in the art is annular in shape and centred on a longitudinal axis 22 of the turbine engine.

Thus, the air flow F passing through the fan 6 is divided into two separate flows after it comes into contact with the upstream end of the splitter 14, namely into a primary flow F1 entering channel 16 and a secondary flow F2 entering channel 18 and passing through the fan outlet guide vane assemblies 12.

Furthermore, the turbine engine comprises a rotating inlet cowl 30 at its forward end fixed in rotation to the fan 6. In a known manner, the cowl 30 is provided with a forward cone 32 with axis 33, and an aft shroud 36 installed fixed on the cone 32, preferably by bolts 38. Its aft end is flush with the platforms 40 of the fan blades 42, in aerodynamic continuity in front of these platforms.

One of the special features of this invention is that the forward end 44 of the rotating inlet cowl 30 is eccentric from the rotation axis 34 of this cowl 30, the axis 34 also corresponding to the axis of the fan 6, and more generally to the longitudinal axis 22 of the turbine engine.

Figure 2:
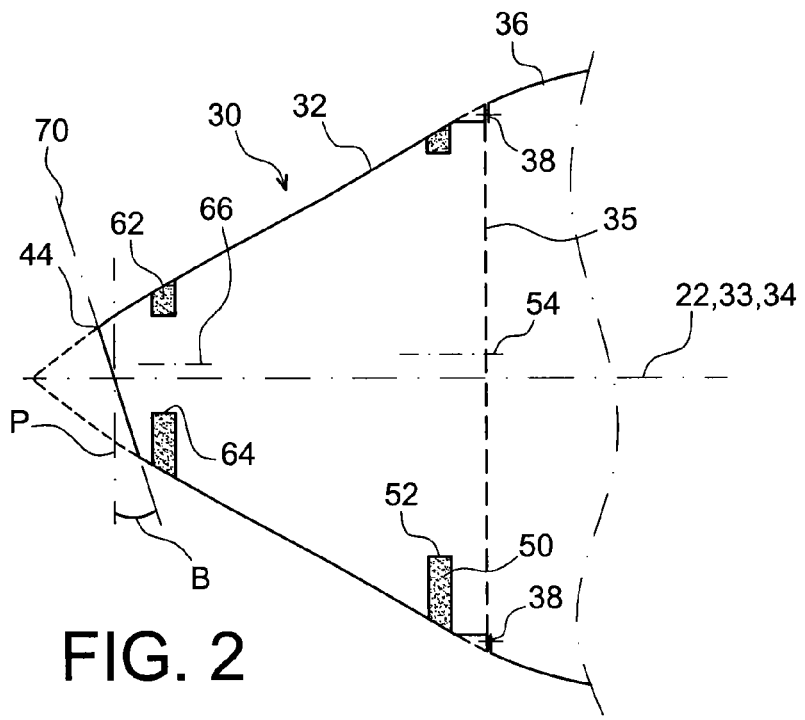
FIG. 2 schematically shows an enlargement of the rotating inlet cowl fitted on the turbine engine shown in FIG. 1.
Figure 3:
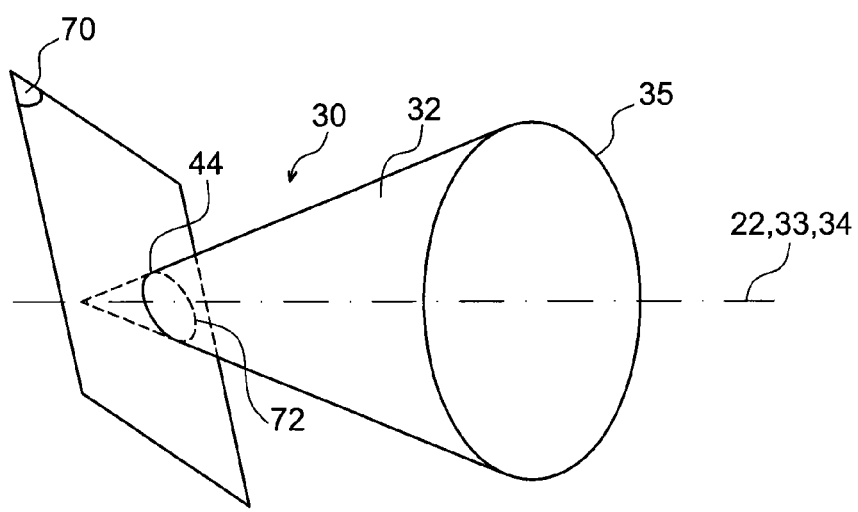
FIG. 3 shows a perspective diagrammatic view of the forward cone fitted on the rotating inlet cowl shown in FIG. 2.

In the preferred embodiment shown in FIGS. 1 to 3, the eccentric nature of the forward end 44 is obtained using a straight forward cone 32, the axis 33 of which is coincident with the rotation axis 34 of the cone and the longitudinal axis of the turbine engine 22. Furthermore, the forward part of this cone is truncated by an approximately plane truncation surface 70 inclined relative to a plane P orthogonal to the axes 22, 34, for example by an angle B between 1 and 15°. Thus, the truncation can define the forward eccentric end 44 because it corresponds to the most forward part of the ellipse 72 formed by the intersection between the cone 32 and the approximately plane truncation surface 70 as can be seen in FIG. 3.

It is noted that a similar embodiment could be envisaged with an oblique forward cone 32, namely with an axis 33 inclined relative to the rotation axis 34.

In a known manner, a balancing bead 50 could be fitted on the forward cone 32, on the inside close to the bolted connection to the aft shroud 36. Therefore, the purpose of this bead 50 is to compensate for the unbalanced mass, and therefore it has a variable thickness along the circumferential direction as shown diagrammatically in FIG. 2. It may be made by making a reaming 52 with axis 54 eccentric from the axes 22, 34. Another balancing bead 62 is provided to complete the balancing bead 50 and to compensate for the unbalanced mass resulting essentially from the offset of the forward end 44 relative to the rotation axis 34, arranged on the inside close to the forward end 44. Therefore this bead 62 has a variable thickness along the circumferential direction as shown diagrammatically in FIG. 2, and it could also be made by making a reaming 64 with axis 66 eccentric from axes 22, 34. Alternatively, or simultaneously, the unbalanced mass could be compensated by varying the thickness of the skin from which the cone 32 is formed, in the circumferential direction.

When the fan and the inlet cowl 30 rotate with the eccentric forward end 44 on which ice 60 has collected, significant centrifugal forces are applied to the ice facilitating its ejection from the cowl.

Naturally, various modifications can be made by the skilled man in the art to the invention which has just been described, solely as non-restrictive examples.

The invention claimed is:

1. A rotating inlet cowl of a gas turbine engine, the inlet cowl including a rotation axis and comprising:
    a forward cone defining a forward end of the inlet cowl,
    wherein the forward end is configured to be eccentric relative to the rotation axis of the inlet cowl,
    wherein the forward cone is truncated by a truncation surface defining the forward end of the inlet cowl, and
    wherein the forward cone includes an axis parallel to and coincident with the rotation axis of the inlet cowl.

2. The rotating inlet cowl according to claim 1, wherein the forward cone includes at least one balancing bead that includes a variable thickness along a circumferential direction, to compensate for an unbalanced mass.

3. A turbine or aircraft engine, comprising the rotating inlet cowl according to claim 1.

4. A rotating inlet cowl of a gas turbine engine, the inlet cowl including a rotation axis and comprising:
    a forward cone defining a forward end of the inlet cowl,
    wherein the forward end is configured to be eccentric relative to the rotation axis of the inlet cowl,
    wherein the forward cone is truncated by a truncation surface defining the forward end of the inlet cowl, and
    wherein the truncation surface is approximately a plane that is inclined relative to a plane orthogonal to the rotation axis of the inlet cowl.

5. The rotating inlet cowl according to claim 4, wherein the forward cone includes at least one balancing bead that includes a variable thickness along a circumferential direction, to compensate for an unbalanced mass.

6. The rotating inlet cowl according to claim 4, wherein the truncation surface is inclined relative to the plane orthogonal to the rotation axis of the inlet cowl by an angle between 1° and 15°.

7. A turbine or aircraft engine, comprising the rotating inlet cowl according to claim 4.

8. A rotating inlet cowl of a gas turbine engine, the inlet cowl including a rotation axis and comprising:
    a forward cone defining a forward end of the inlet cowl,
    wherein the forward end is configured to be eccentric relative to the rotation axis of the inlet cowl,
    wherein the forward cone is truncated by a truncation surface defining the forward end of the inlet cowl, and
    wherein the forward cone is forward from a rear shroud.

9. The rotating inlet cowl according to claim 8, wherein the forward cone includes at least one balancing bead that includes a variable thickness along a circumferential direction, to compensate for an unbalanced mass.

10. A turbine or aircraft engine, comprising the rotating inlet cowl according to claim 8.

* * * * *